US009509855B2

(12) United States Patent
Eder

(10) Patent No.: US 9,509,855 B2
(45) Date of Patent: Nov. 29, 2016

(54) ALL DIGITAL DSL SYSTEM MIGRATION

(75) Inventor: Alois Eder, Neubiberg (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 1043 days.

(21) Appl. No.: 12/502,720

(22) Filed: Jul. 14, 2009

(65) Prior Publication Data

US 2011/0013679 A1    Jan. 20, 2011

(51) Int. Cl.
*H04M 1/24* (2006.01)
*H04M 3/08* (2006.01)
*H04M 3/22* (2006.01)
*H04M 3/42* (2006.01)
*H04M 11/06* (2006.01)

(52) U.S. Cl.
CPC ................................. *H04M 11/062* (2013.01)

(58) Field of Classification Search
CPC ........... H04M 3/2209; H04M 11/062; H04M 3/306; H04M 3/304; H04M 1/24
USPC ......... 379/15.03–15.05, 201.12, 325, 399.01
See application file for complete search history.

(56) References Cited

U.S. PATENT DOCUMENTS

| | | | |
|---|---|---|---|
| 6,535,580 B1* | 3/2003 | Strauss et al. | 379/27.01 |
| 7,349,385 B2* | 3/2008 | Wattwood et al. | 370/354 |
| 8,666,027 B2* | 3/2014 | Eder | H04M 11/062 |
| | | | 379/15.03 |
| 2002/0122539 A1* | 9/2002 | Chea et al. | 379/27.01 |
| 2004/0234043 A1* | 11/2004 | Argo | 379/15.03 |
| 2006/0233352 A1* | 10/2006 | Ploumen | 379/399.01 |
| 2007/0153981 A1* | 7/2007 | Afzal et al. | 379/22 |
| 2009/0310756 A1* | 12/2009 | Brugman et al. | 379/27.02 |
| 2010/0111268 A1* | 5/2010 | Brugman et al. | 379/1.03 |

FOREIGN PATENT DOCUMENTS

EP    1111896 A1    6/2001

OTHER PUBLICATIONS

"Systems Aspects of APON/VDSL Deployment", Peter Vetter et al., IEEE Communications Magazine, IEE Service Center, Piscataway, U.S., vol. 38, No. 5, May 1, 2000, pp. 66-72.
"The all Digital Loop; Benefits of an Integrated Voice-Data Access Network", 200 International Conference on Communication Technology Proceedings. Aug. 21-25, 200, Beijing, China, WCC 200, Piscataway, U.S., vol. 1. Aug. 21, 2000, pp. 1-21.
Patent Cooperation Treaty, International Search Report and Written Opinion, Oct. 14, 2010, International Application No. PCT/EP2010/004245.

* cited by examiner

*Primary Examiner* — Quoc D Tran
(74) *Attorney, Agent, or Firm* — Eschweiler & Associates, LLC

(57) ABSTRACT

The described implementations relate to migrating from a Digital Subscriber Line (DSL) system implementing Plain Old Telephone Service (POTS) equipment that handles analog communication signals to a DSL system that implements All Digital (AD) enabled equipment capable of handling DSL data and Internet Protocol (IP) telephony traffic.

18 Claims, 6 Drawing Sheets

ALL DIGITAL DSL SYSTEM MIGRATION

BACKGROUND

Digital subscriber line (DSL) technology has quickly emerged as a high quality solution for high speed Internet access. DSL can transmit both voice and data, including video data, simultaneously over an existing, single copper pair up to 18,000 feet long. Since DSL can utilize existing telephone lines, the service costs associated with DSL are relatively low for network providers and customers. Moreover, since data can be transmitted relatively quickly using DSL, it is a very attractive option for providing high-speed access to customers.

A traditional DSL architecture that is deployed in a Central Office or Street Cabinet (both referred to as CO), may include a Main Distribution Frame (MDF) that couples wire connections within the CO to connections exterior of the CO (e.g., DSL modems located at customer locations). A DSL Access Multiplexer (DSLAM) may be housed in the CO. The DSLAM may include one or more DSL linecards. The one or more DSL linecards may receive customer DSL connections and aggregate those connections onto one or more high-density connections coupled to the Internet. Each DSL linecard housed in the DSLAM may handle a predetermined number of customer DSL connections.

A legacy baseband switch for ISDN or Plain Old Telephone Service (both referred to as POTS) switch may also be deployed in the CO. The POTS switch may include one or more POTS cards. The one or more POTS cards may receive customer analog voice telephone signals for distribution to the Public Switched Telephone Network (PSTN). Each POTS card housed in the POTS switch may handle a predetermined number of customer analog voice telephone signals.

A splitter may be deployed between the MDF and the DSLAM and POTS switch. The splitter may include highpass and low-pass filters. The high-pass filter distributes DSL signals to the DSLAM, where the low-pass filter distributes analog voice telephone signals to the POTS switch. The splitter may be incorporated into the DSLAM or POTS switch. For example, each DSL linecard may include the splitter. A plurality of splitters may be employed in COs that accommodate high DSL and analog voice traffic.

Recently, network providers have initiated the tedious and costly process of eliminating the POTS switch, in favor of implementing an all digital network that handles voice and data traffic. This all digital network is also known as All Digital Loop (ADL) in a related portion of the International Telecommunications Union (ITU) Standards. DSL internet traffic remains essentially unchanged in the ADL. However, instead of handling customer voice signals by way of a POTS switch and the PSTN, those signals are digitized and distributed over Internet protocol networks, such as the Internet. This digital voice delivery process is conventionally known as Voice over Internet Protocol (VoIP). Internet telephony is not limited to voice signals. Facsimile, voice-messaging and other related signals may also be distributed using the Internet.

Migrating from a traditional DSL architecture that is implemented with DSLAMs and POTS switches has proven to be difficult. One migration option involves replacing existing DSLAMs and POTS switches with ADL equipment capable of handing DSL internet traffic and digitized signals originating from customer implemented POTS devices (e.g., telephones and facsimile machines). Although this migration option is quick, all customers coupled to a DSLAM that is being brought offline need to be simultaneously switched to the ADL equipment that is replacing the DSLAM. Moreover, all customers being switched to the ADL equipment will likely require a Customer Premises Equipment (CPE) upgrade to ensure legacy customer POTS devices will operate with the ADL equipment at the CO. A second migration option involves replacing each individual DSL linecard housed in a DSLAM with an ADL enabled DSL linecard. This approach may be beneficial, as only those customers associated with the DSL linecard being replaced are affected. However, the second approach still necessitates simultaneously switching the customers associated with the DSL linecard to the ADL enabled DSL linecard. Moreover, exchanging individual DSL linecards is a manual process that is time consuming and involves significant man-hour costs. Finally, a third migration option involves replacing existing DSLAMs and POTS switches with ADL equipment, and moving individual customers over to the ADL equipment one by one. Currently, the third approach may only be accomplished via MDF reconfiguration. In particular, reconfiguration of an MDF to accommodate moving individual customers over to the ADL equipment may require mechanically rewiring individual customer connections to the ADL equipment. Such rewiring would be a prohibitively immense undertaking.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

The following description describes implementations related to migrating from a Digital Subscriber Line (DSL) system implementing legacy baseband service equipment, such as ISDN or Plain Old Telephone Service equipment, (referred to herein as POTS) that handles analog communication signals to a DSL system that implements All Digital (AD) enabled equipment capable of handling DSL data and Internet Protocol (IP) telephony data, such as Voice over Internet Protocol (VoIP) traffic. The AD enabled equipment may be All Digital Loop (ADL) equipment, in accordance with the relevant International Telecommunications Union (ITU) Standards. In one implementation, one or more existing DSL linecards housed in a DSL Access Multiplexer (DSLAM) are replaced with AD enabled DSL linecards that incorporate dual use functionality that enables all digital operation (DSL and IP telephony) and conventional POTS connectivity. Network management functionality (e.g., network management software) may be deployed to recognize customers that have put into service AD enabled Customer Premises Equipment (CPE). Customers recognized as having such AD enabled CPE may be switched over to AD operation. That is, the network management functionality may enable such users for AD access that includes VoIP and other IP telephony related services. Similarly, the network management functionality may disable conventional POTS service for those customers that deploy AD enabled CPE.

The implementations described herein enable a network provider to easily and quickly migrate customers to AD DSL operation on a one by one basis, or by groups of customers. However, the logistical burden of having to simultaneously migrate customers to AD DSL is eliminated by the implementations described herein. Furthermore, the described implementations substantially eliminate having to physically rewire connections during the migration process. That is, as a customer or a plurality of customers is migrated to AD DSL operation, their associated POTS functionality may be disabled by a network management module. And eventually, after all customers associated with a given AD enabled linecard are migrated to AD DSL operation, the network provider may simply remove the corresponding POTS infrastructure (e.g., POTS switch and splitter).

Figure 1:
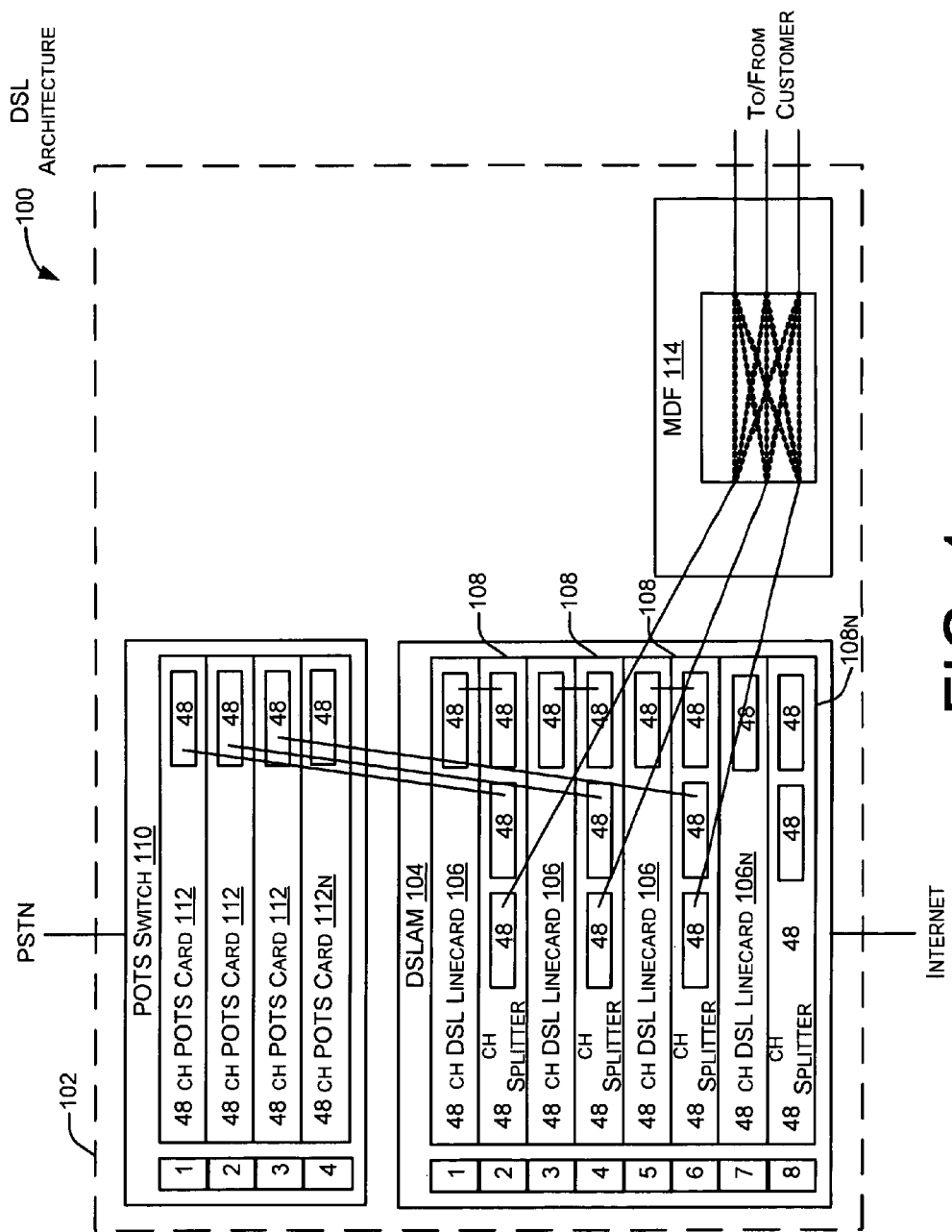
FIG. 1 illustrates an exemplary implementation of a conventional Digital Subscriber Line (DSL) architecture that may be deployed in a Central Office (CO).

FIG. 1 illustrates an exemplary implementation of a conventional DSL architecture 100 that may be deployed in a Central Office (CO) 102. In a particular implementation, the DSL architecture 100 may be an ADSL architecture, an ADSL 2 architecture, an ADSL 2+ architecture, a Very high data rate DSL (VDSL), or any other xDSL architecture.

As illustrated in FIG. 1, the DSL architecture 100 may include at least one DSL access multiplexer (DSLAM) 104 that is located at the CO 102. The DSLAM 104 may include a plurality of DSL linecards 106-106n. Each DSL linecard 106-106n deployed in the DSLAM 104 may have an associated splitter 108-108n. The DSL architecture 100 may also include a POTS switch 110. The POTS switch 110 may include a plurality of POTS cards 112-112n. The DSL architecture 100 may also include a Main Distribution Frame (MDF) 114. The DSL architecture may also include a network management module (not illustrated), which coordinates or controls certain functionalities associated with devices deployed in the CO 102.

In the following, multiple devices illustrated in FIG. 1, and other figures related hereto, may be referenced in the singular to improve the readability of this disclosure. However, each of the plural devices may have the same or similar operational characteristics as the like or similar devices explicitly described herein.

Operationally, the MDF 114 may receive analog and DSL signals that originate from customer locations. The MDF 114 may also distribute analog and DSL signals to customer locations. The MDF 114 is coupled to the splitter 108. The role of the splitter 108 is to combine the lower frequency signals from the POTS card 112 with the higher frequency DSL data signals from the DSL linecard 106 in such a way that the high and low signals with not interfere one another. Similarly, the splitter 108 may also be capable of separating analog and digital signals sent by customers back into constituent component signals and then direct those signals to the appropriate destination entities. In FIG. 1, the splitter 108 is depicted as an independent component associated with the DSL linecard 106. Alternatively, the splitter 106 may be an independent component associated with the POTS switch 110, or implemented as a standalone device at the CO 102.

The POTS switch 110 illustrated in FIG. 1 may be responsible for managing analog signals, incoming and outgoing, associated with the Public Switched Telephone Network (PSTN). The DSLAM 104 may be responsible for managing DSL signals, incoming and outgoing, associated with Internet. The MDF 114 may be responsible for distributing, incoming and outgoing, combined analog and DSL signals associated with customers having DSL service. Moreover, the MDF 114 distributes, incoming and outgoing, signals associated with the Internet and the PSTN. Alternatively, as illustrated, Internet and PSTN signals, incoming and outgoing, may be managed by the DSLAM 104 and the POTS switch 110, respectively.

Figure 2:
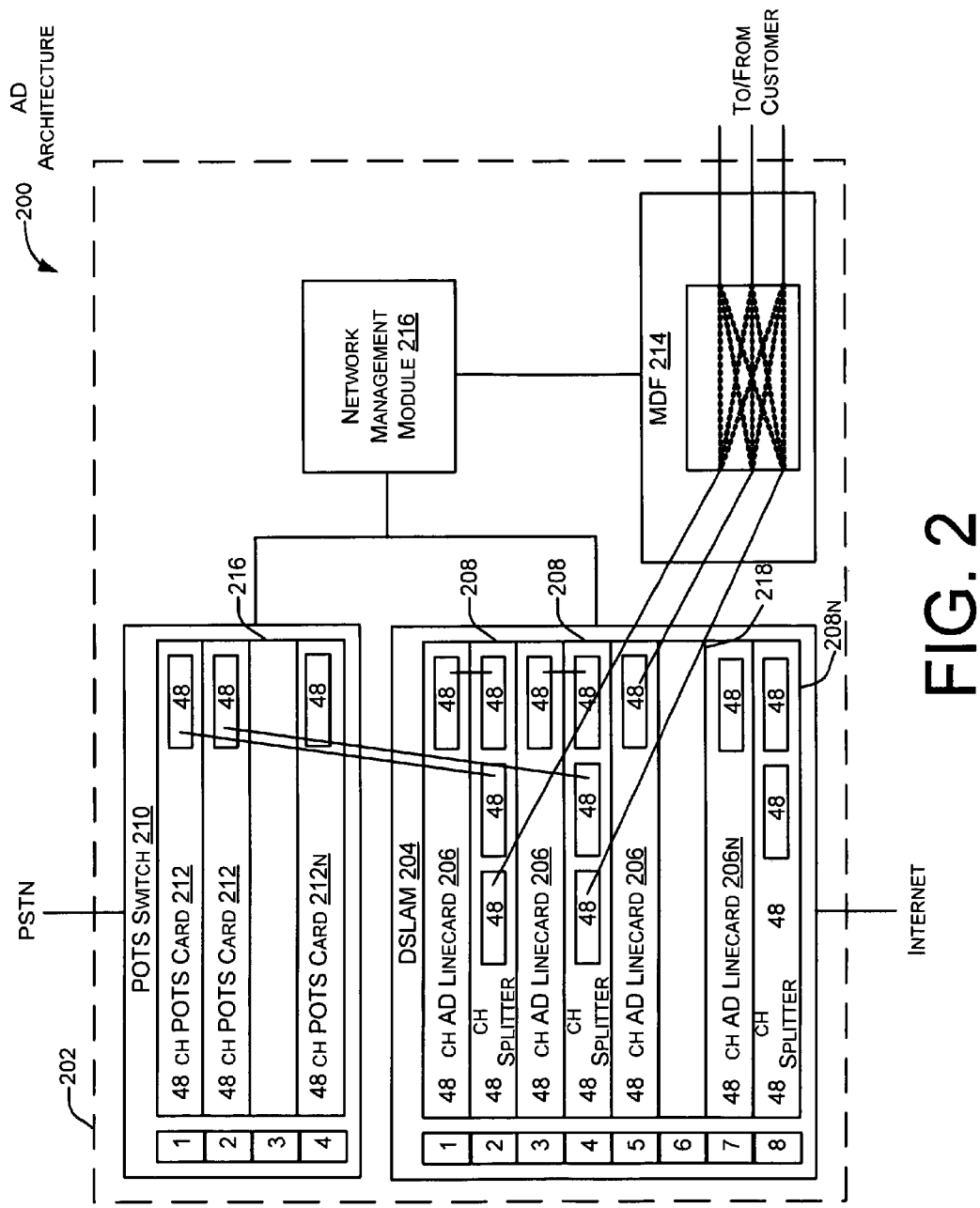
FIG. 2 illustrates an exemplary implementation of an All Digital (AD) architecture that may be deployed in a CO.

FIG. 2 illustrates an exemplary implementation of an AD architecture 300 that may be deployed in CO 202. In a particular implementation, the AD architecture 200 may be a DSL architecture that is designed to function as an all digital loop in which telephone signals may be digitized and encapsulated in digital data frames to be in-band transferred. That is, the POTS signals, such as ringing signal and metering pulses, may be encoded and also encapsulated in the digital data frames. In comparison to the conventional DSL systems that provide digital data transfer in overlay with POTS signals by using separate frequency bands for analog POTS transfer and digital data transfer, the all digital loop has several advantages: bulky data/POTS splitters are not required; the available bandwidth for the digital data bands increases; several telephone signals may be multiplexed with digital data on a twisted pair copper wires; and the transmission quality may improve because the complete transmission is digitized.

As will be understood by the following description, migration to the AD architecture 200 illustrated in FIG. 2 is eased by enabling customers to maintain POTS communications as other customers are upgraded to an AD mode associated with an AD enabled DSL linecard that is also capable of operating in another mode that supports DSL and POTS signals. In the AD mode, POTS signals may be encoded and also encapsulated in digital data frames that may include Internet traffic or other digital data. Therefore, the AD mode may not reserve the 0-4 kHz frequency range that is normally available to POTS communications devices. In the another mode, the respective frequency ranges for POTS signals and DSL signals (e.g., 25 kHz-1.1 MHz) may be maintained.

As illustrated in FIG. 2, the AD architecture 200 may include at least one DSLAM 204 that is located at the CO 202. The DSLAM 204 may include a plurality of AD enabled DSL linecards 206-206n. The AD enabled DSL linecards 206-206n may incorporate the afore-described dual-mode functionality. Each AD enabled DSL linecard 206-206n deployed in the DSLAM 204 may have an associated splitter 208-208n. The DSL architecture 200 may also include a POTS switch 210. The POTS switch 210 may include a plurality of POTS cards 212-212n. The AD architecture 200 may also include a MDF 214. A network management module 216 may be deployed at the CO 202 to manage operational functionalities associated with the POTS switch 210, the DSLAM 204 and the MDF 214. Although the network management module 216 is illustrated as a separate module, the module 216 or the functionality thereof may also be integrated in one or more of the devices shown in FIG. 2.

The POTS card 212 illustrated in FIG. 2 may have 48 associated channels. Each of the 48 channels may be assigned to an individual customer site. And each of the 48 channels associated with the POTS card 212 is capable of communicating POTS signals. The POTS card 212 may be coupled to the splitter 208, which may have 48 POTS channels. Each of the 48 POTS channels may be coupled to a corresponding one of the 48 channels associated with the POTS card 212.

The AD enabled DSL linecard 206 may also have 48 associated channels. Each of these 48 channels may be assigned to an individual customer site. And each of the 48 channels associated with the AD enabled DSL linecard 206 may be configured as a DSL signal channel or an AD signal channel. The AD enabled DSL linecard 206 may be coupled to the splitter 208, which may have 48 DSL channels. Each of the 48 DSL channels may be coupled to a corresponding one of the 48 channels associated with the AD enabled DSL linecard 206.

Activation and deactivation of the individual channels associated with the POTS cards 212-212n and the splitter 208 may be controlled by the network management module 216. Furthermore, the network management module 216 may be implemented to configure the 48 channels associated with each of the AD enabled DSL linecards 206-206n. In particular, the network management module 216 may configure each of the 48 channels to operate in a first mode or a second mode. The first mode may enable the AD enabled DSL linecard 206 to operate in AD mode (e.g., no POTS functionality) and the second mode may enable the AD enabled DSL linecard 206 to operate in standard DSL mode (e.g., with POTS functionality).

The various devices associated with the POTS switch 210 and the DSLAM 204 have 48 channel capability, but other channel capability is also possible.

Operationally, the MDF 214 may receive analog, AD and DSL signals that originate from customer locations. The MDF 214 may also distribute analog, AD and DSL signals to customer locations. The MDF 214 may be coupled to the splitter 208. One role of the splitter 208 is to combine the lower frequency signals from the POTS card 212 with the higher frequency DSL data signals from the AD enabled DSL linecard 206 in such a way that the high and low signals with not interfere with one another. Similarly, the splitter 208 may also be capable of separating analog and digital signals sent by customers back into constituent component signals and then direct those signals to the appropriate destination entities. In FIG. 2, the splitter 208 is depicted as an independent component associated with the AD enabled DSL linecard 206. Alternatively, the splitter 206 may be an independent component associated with the POTS switch 210, an component integrated in the AD enabled DSL linecard 206, or implemented as a standalone device at the CO 202. The splitter 208 may not be required for channels operating in AD mode. Therefore, the network management module 216 may configure the MDF 214 to bypass the splitter 208 for those channels enabled to operate in AD mode.

The POTS switch 210 illustrated in FIG. 2 may be responsible for managing analog signals, incoming and outgoing, associated with the Public Switched Telephone Network (PSTN). The DSLAM 204 may be responsible for managing DSL signals, incoming and outgoing, associated with Internet. Furthermore, the DSLAM 204 may be responsible for managing AD signals, incoming and outgoing, associated with the Internet and IP telephony. The MDF 214 may be responsible for distributing, incoming and outgoing, combined analog and DSL signals associated with customers having DSL service, and AD signals. Moreover, the MDF 214 distributes, incoming and outgoing, signals associated with the Internet and the PSTN. Alternatively, as illustrated, Internet and PSTN signals, incoming and outgoing, may be managed by the DSLAM 204 and the POTS switch 210, respectively.

The POTS switch 210 includes an open POTS card slot 216. In addition, the DSLAM 204 also includes an open splitter slot 218. The POTS card 212, which was once positioned in the open POTS card slot 216, was removed after all customers associated with the POTS card 212 and an associated AD linecard 206 were migrated to the AD mode. Correspondingly, the splitter 208, which was once positioned in the open splitter slot 218, was removed after all the customers associated with the POTS card 212 and the associated AD linecard 206 were migrated to the AD mode.

Figure 2A:
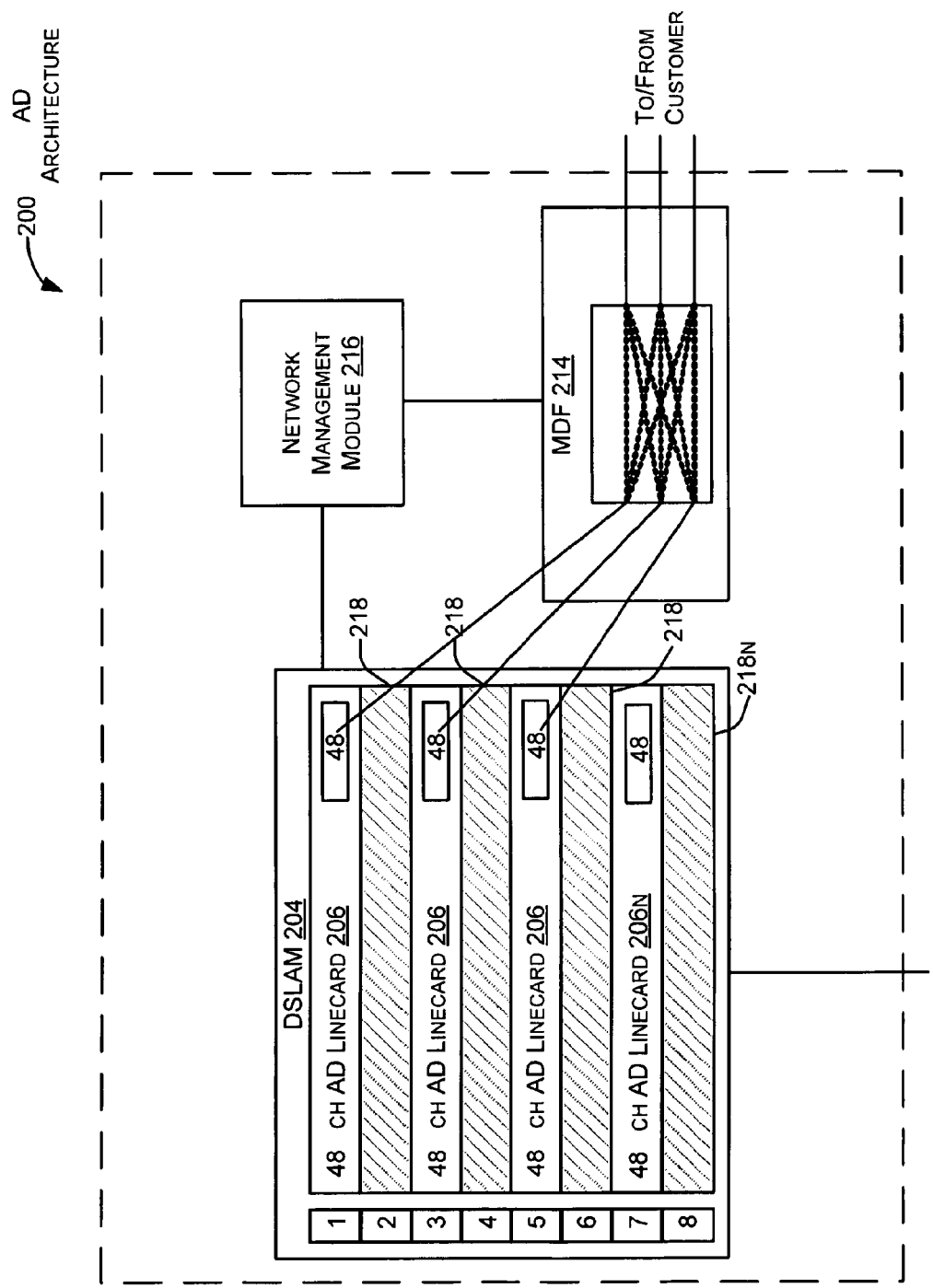
FIG. 2A illustrates the exemplary implementation of the AD architecture of FIG. 2, after full migration to AD DSL.

FIG. 2A illustrates the exemplary implementation of the AD architecture of FIG. 2, after full migration to AD DSL is complete for all customers associated with the CO 202. As is illustrated, the POTS switch 210 has been removed from the CO 202, as all the customers associated with the CO 202 are now IP telephony (e.g., VoIP) enabled. Moreover, as is illustrated, the splitters 208-208n have been removed, which leaves open splitter slots 218-218n. The open slots 218-218n may be filled with additional AD enabled DSL linecards, if the AD DSL capacity offered by the CO 202 is to be increased.

Further details related to an exemplary procedure for migrating customers to the AD mode are described in connection with FIG. 4. The exemplary procedure enables incremental customer by customer migration to the AD mode by way of the AD architecture 200. Once all of the customers associated with the AD architecture 200 are migrated to the AD mode, each of the splitters 208 and POTS cards 212 may be removed from the AD architecture 200. The CO 202, after migration is complete, is show in FIG. 2A.

Figure 3:
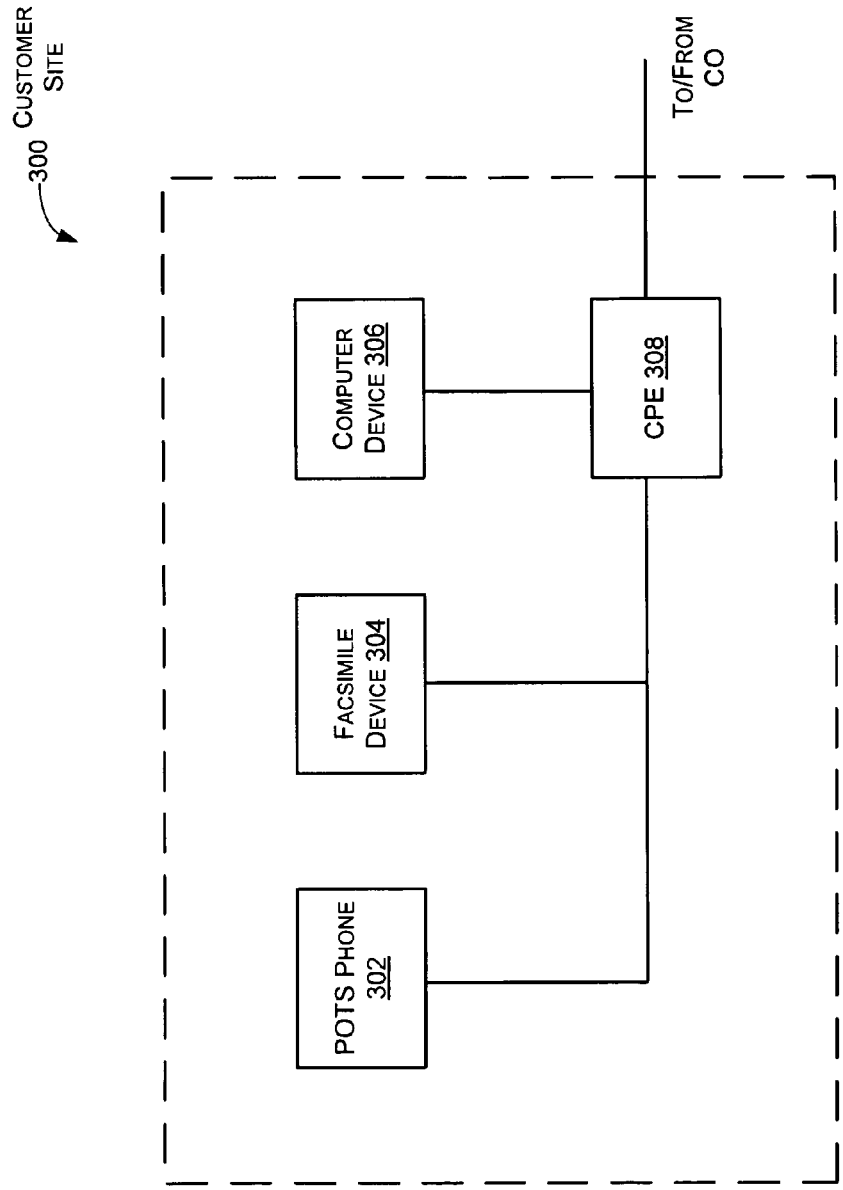
FIG. 3 illustrates an exemplary customer premises that may be coupled to a CO.

FIG. 3 illustrates an exemplary customer site 300 that may be coupled to a CO, such as the CO 202 illustrated in FIG. 2. As depicted in FIG. 3, a POTS phone 302, a facsimile device 304 and a computer device 306, and the like, may be located at the customer site 300. The computer device 306 may be coupled to the AD enabled DSL linecard 206, via a CPE 308 and copper wire infrastructure coupling the customer site 300 to the CO 202. Therefore, the AD enabled DSL linecard 206 may communicate with the computer device 306 via the splitter 208, the MDF 214 and the CPE 308 in order to provide Internet connectivity to the computer device 306. In one implementation, the AD enabled DSL linecard 206 communicates with the computer device 306 in AD mode. In another implementation, the AD enabled DSL linecard 206 communicates with the computer device 306 in DSL mode.

The POTS phone 302 may be coupled to the POTS card 212, via the CPE 308 and the copper wire infrastructure coupling the consumer site 300 to the CO 202. Accordingly, the POTS card 212 may communicate with the POTS phone via the splitter 208, the MDF 214 and the CPE 308 in order to provide analog telephone service to the POTS phone 302. In another implementation, signals generated by the POTS phone 302 may be digitized by the CPE 308 and communicated to the CO 202 over the copper wire infrastructure. These digitized POTS signals may be processed by the AD enabled DSL linecard 206. Therefore, use of the POTS card 212 and the splitter 208 may be circumvented.

In the exemplary, non-limiting, implementation of the customer site 300, the POTS phone 302, the facsimile device 304 and the computer device 306 are illustrated, but any number of telephones, computers and other such devices may be located in the consumer site 300 and coupled to the CO 202. The POTS phone 302 may be any POTS device. Furthermore, the CPE 308 may include modems (such as DSL or cable modems), telephone couplers, set-top boxes, key phone systems, private branch exchanges, and other such customer equipment. Moreover, the CPE 308 may be an AD capable CPE that enables all digital communication (e.g., digital data and IP telephony) with the CO 202.

Specifics of exemplary procedures are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable storage media. The computer-readable storage media can be any available media that can be accessed by a computing device to implement the instructions stored thereon. The exemplary procedures described below may reference one or more of the exemplary devices described in FIGS. 2-3. Therefore, one or more of the devices illustrated in FIGS. 2-3 may implement the described procedures. However, the referenced devices are not limiting of the described procedures.

Figure 4:
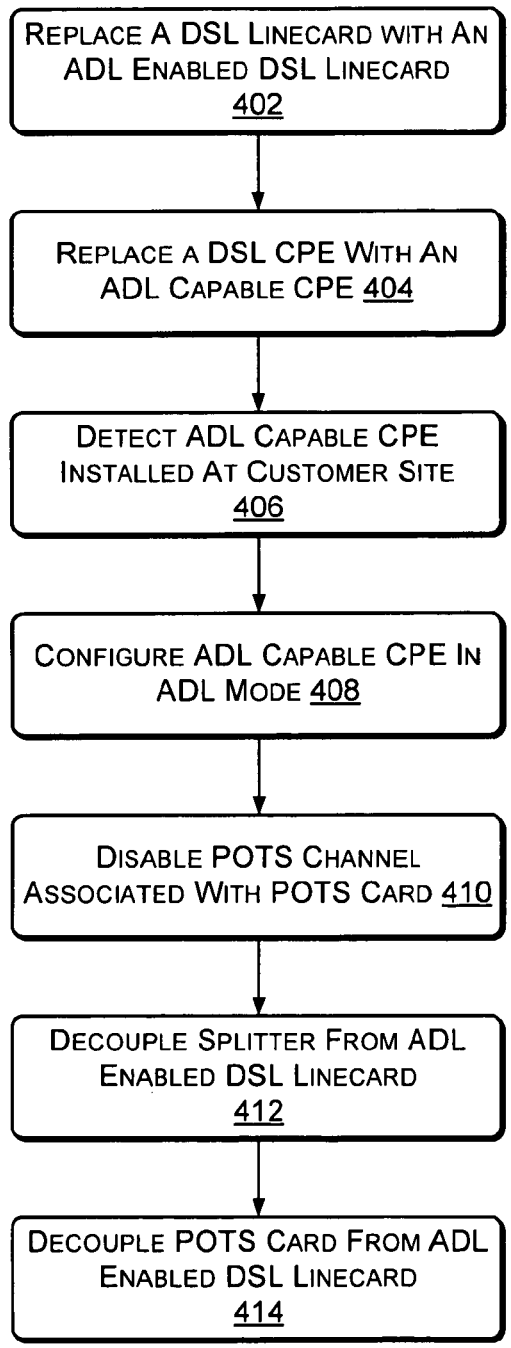
FIG. 4 illustrates an exemplary DSL to AD DSL migration procedure.

FIG. 4 illustrates an exemplary DSL to AD migration procedure. At block 402, a DSL linecard is replaced with an AD enabled DSL linecard. Replacing the DSL linecard with the AD enabled DSL linecard may include coupling a POTS card and a splitter to the AD enabled DSL linecard.

At block 404, a DSL CPE at a customer site is replaced with an AD capable CPE. At block 406, a network management module detects the AD capable CPE installed at the customer site. The detection process may include detecting signature circuitry in the AD capable CPE that indicates that the CPE is an AD enabled device. The detection of the signature circuitry may also be accomplished by way of line testing built into an associated AD enabled DSL linecard or POTS card. The network management module may instruct the AD enabled DSL linecard to initiate the detection process. Alternatively, the detection process may be based on the capability list exchange between CO and the AD capable CPE during DSL training (G.HS) to verify the CPE is AD capable. The capability list exchange process of the DSL training may include connection initiation between the CO and the AD capable CPE and receiving functionality specific information from the AD capable CPE, such information including at least information indicating the DSL modes (e.g., AD DSL mode) supported by the AD capable CPE. DSL training may be carried out by the AD enabled DSL linecard or the network management module.

At block 408, the network management module configures the AD enabled DSL linecard so that a channel associated with the AD capable CPE installed at the customer site is in AD mode. In particular, at block 408, the network management module may switch the AD enabled DSL linecard from a mode that supports DSL and POTS signals to the AD mode that is limited to processing digital signals that may include Internet data and IP telephony.

At block 410, the network management module disables a POTS channel associated with a POTS card, where the disabled POTS channel corresponds to the customer site having the installed AD capable CPE. At block 412, the splitter is decoupled from the AD enabled DSL linecard. At 414, the POTS card is decoupled from the AD enabled DSL linecard. Decoupling of the splitter and POTS card is possible when all channels (i.e., customers) associated with a given AD enabled DSL line card are activated in the AD mode.

Figure 5:
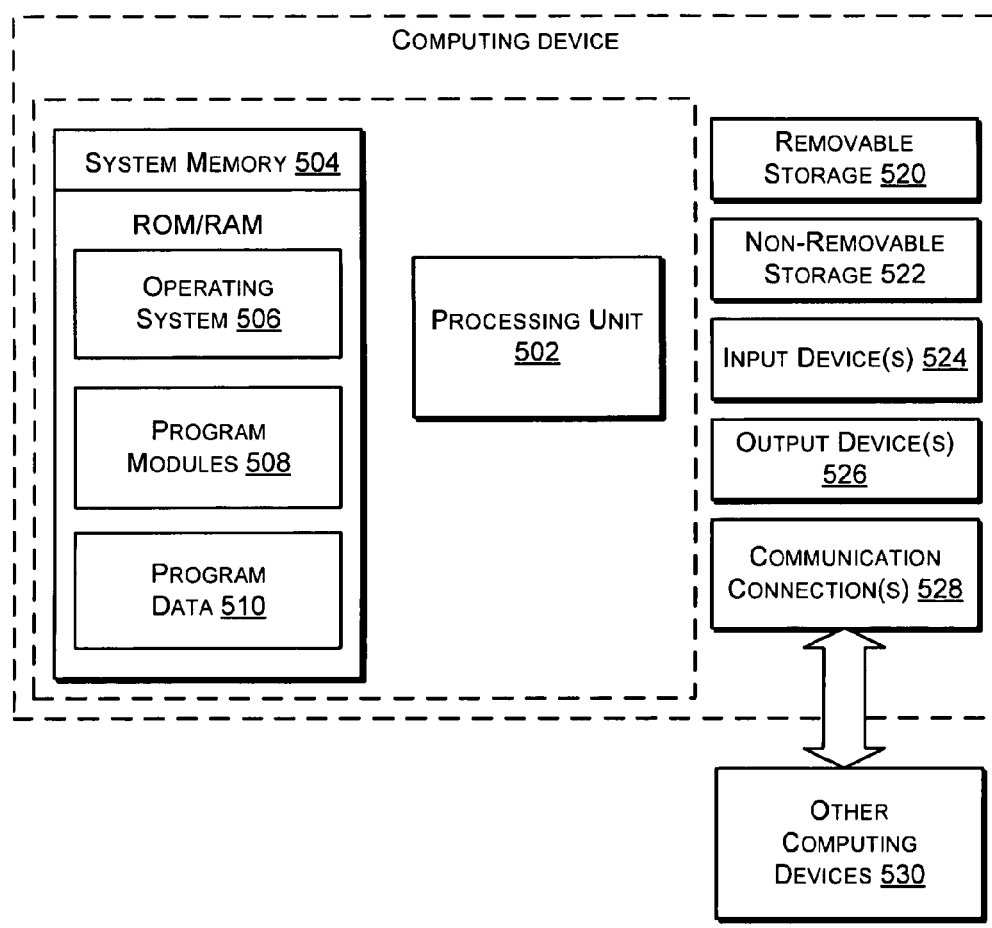
FIG. 5 is an illustrative computing device that may be used to implement the devices, modules, apparatuses, and other hardware.

FIG. 5 is an illustrative computing device that may be used to implement the devices, modules, apparatuses, and hardware discussed herein. In a very basic configuration, the computing device 500 includes at least one processing unit 502 and system memory 504. Depending on the exact configuration and type of computing device 500, the system memory 504 may be volatile (such as RAM), nonvolatile (such as ROM and flash memory) or some combination of the two. The system memory 504 typically includes an operating system 506, one or more program modules 508, and may include program data 510.

For the present implementations, the program modules 508 may realize the various elements described as being associated with the architectures and implementations herein. Other modules and device functionalities described herein may also be part of the program modules 508. The computing device 500 may have additional features or functionality. For example, the computing device 500 may incorporate high pass and low pass filtering functionality. And, the computing device 500 may also include additional data storage devices (removable and/or non-removable) such as, for example, magnetic disks, optical disks, or tape. Such additional storage is illustrated in FIG. 5 by removable storage 520 and non-removable storage 522. Computer storage media may include volatile and nonvolatile, removable and non-removable media implemented in any method or technology for storage of information, such as computer readable instructions, data structures, program modules, or other data. The system memory 506, removable storage 520 and non-removable storage 522 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of the device 500. Computing device 500 may also have input device(s) 524 such as keyboard, mouse, pen, voice input device, and touch input devices. Output device(s) 526 such as a display, speakers, and printer, may also be included. These devices are well known in the art and need not be discussed at length.

The computing device 500 may also contain a communication connection 528 that allow the device to communicate with other computing devices 530, such as over a network. The communication connection may also enable the computing device 500 to wirelessly communicate with many different types of wireless service providers and medium.

Various modules and techniques may be described herein in the general context of computer-executable instructions, such as program modules, executed by one or more computers or other devices. Generally, program modules include routines, programs, objects, components, data structures, and so forth, for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A method, comprising:
   detecting implementation of at least one all digital (AD) capable Customer Premises Equipment (CPE);
   replacing a conventional DSL linecard with an AD enabled Digital Subscriber Line (DSL) linecard having integrated line testing functionality; and
   enabling an AD mode associated with the AD enabled DSL linecard that supports at least the AD mode and another mode that supports DSL and legacy baseband service;
   wherein the act of detecting includes detecting the AD capable CPE by way of a capability list exchange initiated at a Central Office (CO) and between the CPE and the CO during DSL training.

2. The method according to claim 1, further comprising: coupling a POTS card to the AD enabled DSL linecard.

3. The method according to claim 1, further comprising coupling the AD enabled DSL linecard to a splitter, the splitter to handle analog signals associated with a customer POTS device and DSL signals associated with a computing device interfaced with the Internet.

4. The method according to claim 1, wherein the AD enabled DSL linecard is to process Internet Protocol (IP) telephony signals and DSL data signals in the AD mode.

5. The method according to claim 1, wherein the act of detecting includes detecting CPE signature circuitry associated with the AD capable CPE, the CPE signature circuitry indicating compatibility with the AD mode of the AD enabled DSL linecard.

6. The method according to claim 5, wherein the act of detecting the CPE signature circuitry is performed by line testing functionality associated with the AD enabled DSL linecard or by line testing functionality associated with a POTS card.

7. The method according to claim 1, further comprising:
   decoupling a splitter coupled to AD enabled DSL linecard; and
   decoupling a POTS card coupled to the AD enabled DSL linecard.

8. The method according to claim 1, further comprising:
   identifying a POTS signal channel associated with the AD capable CPE; and
   disabling the POTS signal channel.

9. An apparatus, comprising:
   an all digital (AD) enabled Digital Subscriber Line (DSL) linecard to support at least an AD mode and another mode that supports DSL and legacy baseband service; and
   a network management module to initiate detection of at least one all digital (AD) capable Customer Premises Equipment (CPE) and enablement of the AD mode of the AD enabled DSL linecard,
   wherein the AD enabled DSL linecard is to detect the at least one AD capable CPE by way of a capability list exchange initiated at a Central Office (CO) and between the CPE and the CO during DSL training.

10. The apparatus according to claim 9, wherein the network management module is to initiate the AD enabled DSL linecard to detect the at least one AD capable CPE.

11. The apparatus according to claim 10, wherein the AD enabled DSL linecard is to detect the at least one AD capable CPE by way of line testing functionality associated with the AD enabled DSL linecard.

12. The apparatus according to claim 10, wherein the network management module is to disable at least one channel associated with a POTS card and another at least one channel associated with a splitter after detection of the at least one AD capable CPE.

13. A method, comprising:
   detecting implementation of at least one all digital loop (AD) capable Customer Premises Equipment (CPE);
   enabling an AD mode associated with an AD enabled Digital Subscriber Line (DSL) linecard;
   disabling baseband legacy service support to at least one channel associated with the AD capable CPE; and
   disabling at least one POTS card and at least one splitter after enabling the AD mode associated with the AD enabled DSL linecard,
   wherein the act of detecting includes detecting the AD capable CPE by way of a capability list exchange initiated at a Central Office (CO) and between the CPE and the CO during DSL training.

14. The method according to claim 13, wherein the AD enabled DSL linecard is to process Internet Protocol (IP) telephony signals and DSL data signals in the AD mode, the IP telephony signals including at least Voice over IP (VoIP) signals.

15. The method according to claim 13, wherein the act of disabling includes disabling the baseband legacy service support on at least one channel associated with the AD enabled DSL linecard and disabling the baseband legacy service support on at least one channel associated with the at least one POTS card.

16. The method according to claim 15, wherein the act of disabling further includes disabling the baseband legacy service support on at least one channel associated with the at least one splitter.

17. The method according to claim 13, wherein the act of detecting includes detecting CPE signature circuitry associated with the AD capable CPE, the CPE signature circuitry indicating compatibility with the AD mode of the AD enabled DSL linecard.

18. The method according to claim 17, wherein the act of detecting the CPE signature circuitry is performed by line testing functionality associated with the AD enabled DSL linecard or by line testing functionality associated with a POTS card.

* * * * *